United States Patent
Chou et al.

(12)

(10) Patent No.: US 10,190,243 B2
(45) Date of Patent: *Jan. 29, 2019

(54) METHOD OF PREPARING OF NATURAL GRAPHENE CELLULOSE BLENDED MELTBLOWN NONWOVEN FABRIC

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW); Shao-Hua Chou, Taichung (TW); Chia-Yu Hsu, Taichung (TW)

(73) Assignee: ACELON CHEMICALS AND FIBER CORPORATION, Changhua County (TW)

( * ) Notice: Subject to any disclaimer, the term of this patent is extended or adjusted under 35 U.S.C. 154(b) by 180 days.

This patent is subject to a terminal disclaimer.

(21) Appl. No.: 15/283,472

(22) Filed: Oct. 3, 2016

(65) Prior Publication Data

US 2017/0107650 A1  Apr. 20, 2017

(30) Foreign Application Priority Data

Oct. 20, 2015  (TW) .............................. 104134352 A

(51) Int. Cl.
*D04H 1/485* (2012.01)
*D01D 1/02* (2006.01)
(Continued)

(52) U.S. Cl.
CPC ............. *D04H 1/56* (2013.01); *C01B 32/192* (2017.08); *C01B 32/23* (2017.08); *D01D 1/02* (2013.01);
(Continued)

(58) Field of Classification Search
CPC .......... D04H 1/00; D04H 3/013; C01B 32/23; D01F 2/00; D01F 13/00; D01F 1/10; D01D 5/0985; D01D 1/02; Y02P 70/625
See application file for complete search history.

(56) References Cited

U.S. PATENT DOCUMENTS 4,895,712 A  1/1990 Komine et al.
6,524,501 B1  2/2003 Arai et al.
(Continued)

*Primary Examiner* — Nahida Sultana
(74) *Attorney, Agent, or Firm* — Bacon & Thomas, PLLC

(57) ABSTRACT

This application describes a method of preparation of a natural graphene cellulose blended meltblown nonwoven fabric, which comprises using a graphite powder as a raw material for preparing a graphene solution, adding the graphene solution to a slurry formed by mixing and dissolving a wood pulp with N-methylmorpholine N-oxide (NMMO), removing the water content thereof to form a spinning dope, and then directly preparing the natural graphene cellulose blended meltblown nonwoven fabric by a meltblown process. The present method does not require a highly toxic hydrazine hydrate solution. Further, by increasing the adding ratio of the graphene solution in the manufacturing process, control of the antistatic properties and thermal transferring function can be achieved, and thereby various requirements of different consumers can be satisfied. Besides, the fabric can decompose naturally after being used, and thus the product is harmless, natural, and environmentally friendly.

10 Claims, 6 Drawing Sheets

(51) Int. Cl.
*D04H 1/49* (2012.01)
*D01F 8/18* (2006.01)
*D04H 1/56* (2006.01)
*D01D 5/098* (2006.01)
*D01D 10/06* (2006.01)
*D01F 1/10* (2006.01)
*D01F 2/00* (2006.01)
*D01F 13/00* (2006.01)
*D04H 1/4258* (2012.01)
*D04H 3/013* (2012.01)
*D04H 3/16* (2006.01)
*C01B 32/23* (2017.01)
*C01B 32/192* (2017.01)

(52) U.S. Cl.
CPC .......... *D01D 5/0985* (2013.01); *D01D 10/06* (2013.01); *D01F 1/10* (2013.01); *D01F 2/00* (2013.01); *D01F 13/00* (2013.01); *D04H 1/4258* (2013.01); *D04H 3/013* (2013.01); *D04H 3/16* (2013.01); *Y02P 70/625* (2015.11)

(56) References Cited

U.S. PATENT DOCUMENTS

| | | | |
|---|---|---|---|
| 8,127,575 | B2 | 3/2012 | Burrow et al. |
| 2006/0216222 | A1* | 9/2006 | Jang .............. B82Y 30/00 423/448 |
| 2006/0223052 | A1* | 10/2006 | MacDonald .......... C12Q 1/04 435/5 |
| 2010/0108367 | A1* | 5/2010 | Furushita .......... C08F 283/002 174/258 |
| 2011/0133132 | A1* | 6/2011 | Zhamu .............. B82Y 30/00 252/503 |
| 2014/0000003 | A1* | 1/2014 | Ashraf ............. A61F 13/514 2/69 |
| 2014/0000070 | A1* | 1/2014 | Ashraf ............. A61F 13/627 24/448 |
| 2014/0000784 | A1* | 1/2014 | Rane ............... A61F 13/627 156/62.8 |
| 2014/0004344 | A1 | 1/2014 | Kim et al. |
| 2017/0107643 | A1* | 4/2017 | Chou ................ D01D 1/02 |
| 2017/0107644 | A1* | 4/2017 | Chou ................ D01D 1/02 |
| 2018/0037460 | A1* | 2/2018 | Fu .................. C01B 32/184 |
| 2018/0187353 | A1* | 7/2018 | Shiraishi ............ D04H 3/16 |

* cited by examiner

METHOD OF PREPARING OF NATURAL GRAPHENE CELLULOSE BLENDED MELTBLOWN NONWOVEN FABRIC

FIELD OF THE PRESENT INVENTION

The present invention relates to a method of preparing natural graphene cellulose blended meltblown nonwoven fabric, which is a green environmental process in the technology field of manufacturing nonwoven fabric of natural fibers. The method includes using a graphite powder as raw material for preparing a graphene solution, adding the graphene solution into a slurry formed by mixing and dissolving wood pulp with N-methylmorpholine N-oxide, and removing water content from the slurry to form a spinning dope, and then manufacturing a natural graphene cellulose nonwoven fabric directly by a meltblown process. The nonwoven fabric can naturally decompose if discarded after being used, and is harmless to the natural environment, thus it is an environment friendly nonwoven fabric.

BACKGROUND OF THE INVENTION

Graphite is a layered material formed by carbon atoms stacked in orderly layers in a two-dimensional planar network. Since the force between the stacked carbon layers is relatively weak, a graphite layer can be easily peeled off from other layers to form a thin layer graphite sheet. Graphene is one atomic layer of graphite.

Graphene was first explored in 1947, by P. R. Wallace who calculated the electronic structure of graphene, and found its unique linear dispersion properties. However, for a long time scientists suspected that graphene may not exist in reality, since a two-dimensional planar atomic layer was considered as a part of a three-dimensional structure that cannot stably exist alone. Therefore, graphene was considered a hypothetical structure useful only as a model for description of the physical properties of carbon materials. In 2010, Professor Andre Geim and his student Kostya Novoselov were awarded the Nobel Prize in Physics for their innovative research related to graphene.

Because graphene is non-toxic, and has excellent chemical and thermal properties, including good thermal conductivity, high mechanical strength and other useful characteristics, graphene-based materials have been widely used in various industrial fields, especially the textile field. For example, Chinese Patent No. CN103046151 discloses "Graphene-regenerated cellulose blended fiber and preparation method thereof". According to the preparation method described in CN103046151, a graphene oxide solution is mixed with a regenerated cellulose solution to obtain "an intermediate of a graphene-regenerated cellulose blended fiber" through a viscose spinning process, and finally a product of graphene-regenerated cellulose blended fiber is thus manufactured through a reduction step of "intermediate of a graphene-regenerated cellulose blended fibers", wherein in the reduction step, hydrazine hydrate solution with a mass concentration of 1% is selected as a reductant, then at conditions of 20° C., a graphene-regenerated cellulose blended fiber is added in the hydrazine hydrate solution in the bath ratio of 1:100 to reduction for 120 min., and after washing by water and drying, a graphene-regenerated cellulose blended fibers is thus obtained.

As is well known, a hydrazine hydrate solution is a colorless and transparent oily fuming liquid, smells of ammonia, will smoke in humid air and has strong alkalinity and moisture absorption, as well as being classified as a highly toxic substance. It will burn, if exposed to fire or heat. It will cause an explosion, if inadvertently brought into contact with an oxidizing agent. In addition, if a hydrazine hydrate solution is absorbed by a human through, for example, inhalation, ingestion or absorption through the skin, it will be harmful to human health. Repeated skin contact with hydrazine hydrate solution over a long period of time could poison a person working with the solution, such as the operator of the method described in CN103046151, potentially causing dizziness, nausea and other symptoms. Accordingly, the method described in CN103046151, which uses hydrazine hydrate solution as a reductant for reducing "intermediate of a graphene-regenerated cellulose blended fibers" to produce "graphene-regenerated cellulose blended fibers" may be an unsafe process with high risk that is dangerous to an operator.

The present Applicants have filed a number of patent applications related to methods of preparing natural cellulose nonwoven fabric which is harmless to the natural environment, such as patents approved and granted as TW I392779, TW I392780 and TW I392781. These methods use manufacturing processes and conditions that are safe and do not harm the health of operators. Achieving a method of preparing natural graphene cellulose blended nonwoven fabric appears to be urgent and necessary in this technical field.

SUMMARY OF THE INVENTION

The present application describes a method of preparing natural graphene cellulose blended meltblown nonwoven fabric, which comprises the following steps:

(a) combining a graphite powder with a solution comprising 1 to 10 wt % of a first compound selected from the group consisting of sulfuric acid ($H_2SO_4$), hydrochloric acid (HCl), perchloric acid ($HClO_4$), hydrogen iodide (HI), hydrofluoric acid (HF), and nitric acid ($HNO_3$), then stirring for 30 minutes in an ice bath environment;

(b) adding a solution comprising 1 to 20 wt. % potassium permanganate ($KMnO_4$) to the product of step (a), stirring for 1 to 2 hours, and adding distilled water, wherein the potassium permanganate solution is continuously added until none of the purple smoke generated by reacting with the potassium permanganate is formed from the distilled water;

(c) adding a solution comprising 1 to 10 wt. % hydrogen peroxide ($H_2O_2$) to the product of step (b), wherein the hydrogen peroxide solution is added until no bubbles are formed and the mixture becomes dark green, then filtering the dark green solution into a cake;

(d) rinsing the cake of step (c) with a solution comprising 5 wt. % hydrochloric acid (HCl) to remove sulfate ions, then washing the cake with distilled water;

(e) drying the cake of step (d) in an oven at 40° C. for 2 hrs to obtain a dried solid graphite oxide;

(f) adding distilled water to the dried solid graphite oxide of step (e), wherein the distilled water is added up to 200 mls per 0.06 to 1.0 g of the dried solid graphite oxide, then treating by ultrasonic vibration for 30 minutes to obtain a graphite oxide solution having a graphite oxide concentration of 0.03 wt. % to 0.5 wt. %;

(g) adding a solution comprising 1 to 10 wt. % of a second compound selected from the group consisting of sodium borohydride ($NaBH_4$), potassium borohydride ($KBH_4$), lithium aluminum hydride ($LiAlH_4$), and sodium citrate ($C_6H_5Na_3O_7$) to the graphite oxide solution of step (f), then treating by ultrasonic vibration for 30 to 60 minutes, wherein in the resulting solution, the ratio of graphene oxide to the second compound is 1:1 to 1:5 by weight;

(h) filtrating the product of step (g), washing the filtrate with water 3 to 5 times to remove the second compound, then back-filtrating to obtain a graphene solution;

(i) adding the graphene solution of step (h) to a slurry solution formed by mixing a pulp with N-methylmorpholine N-oxide (NMMO) and a stabilizer in an expansion dissolving tank, then mixing at 60 to 80° C., wherein the graphene solution of step (h) is added in a ratio of 0.11 to 5.0 wt. %, the pulp is selected from the group consisting of wood pulp, cotton pulp, bamboo pulp and a mixture of cotton and bamboo pulp, the pulp comprises α-cellulose in an amount of 65% or more with a polymerization degree of 500 to 1500; and the NMMO has a concentration of 50% to 78%;

(j) removing water from the product of step (i) using a Thin Film Evaporator (TFE) and heating at 80 to 130° C., wherein the water is removed to 5% to 13% within 5 minutes and the cellulose is dissolved to form a spinning dope, and the amount ratio of each component among the components comprised in the dope is: water ($H_2O$) 5% to 15%, N-methylmorpholine N-oxide (NMMO) 70% to 90%, and cellulose 5% to 15%;

(k) squeezing the spinning dope of step (j) from a spinning orifice using a meltblown process to form a natural graphene cellulose blended filament strand and piling into a fibrous network structure on a collector, which comprises pressuring the spinning dope by a metering pump, filtrating and degassing by a continuous filter (CPF), transporting the spinning dope into a spinning tank, continuously blowing hot air into the spinning orifice and outputting an air stream from the area surrounding the spinning orifice, forcing the spinning dope to be molten and squeezed to the outside of the spinning orifice to form a uniform natural graphene cellulose blended filament strand, and piling the filament strand onto a fibrous network structure on a collector; and (l) spraying a water mist to force the natural graphene cellulose blended filament strand of step (k) into a coagulation liquid, solidifying, regenerating and washing the filament strand, and water needle punching, drying, oiling and coiling the filament strand to form a natural graphene cellulose blended meltblown nonwoven fabric, wherein the concentration of the coagulation liquid is between 2.0% to 10.0%, and after washing, the amount of residual NMMO solvent is less than 0.1%.

The present method does not require a reduction process, or use of the highly toxic hydrazine hydrate solution which is generally required in a reduction process, thus avoiding the health hazards associated with hydrazine hydrate solutions.

Furthermore, the antistatic property and thermal conductivity of the present natural graphene cellulose nonwoven fabric can be altered by adjusting the ratio of the graphene solution to the wood pulp solution in the manufacturing process to satisfy different consumers. Finally, the present fabric is harmless, natural, and environmentally friendly, at least because it can decompose naturally when it is disposed of after being used.

DETAILED DESCRIPTION OF THE PREFERRED EMBODIMENTS

To further illustrate the preparation process and the effectiveness of the present invention, it is described in detail with reference to drawings and various test examples as follows.

Figure 1:
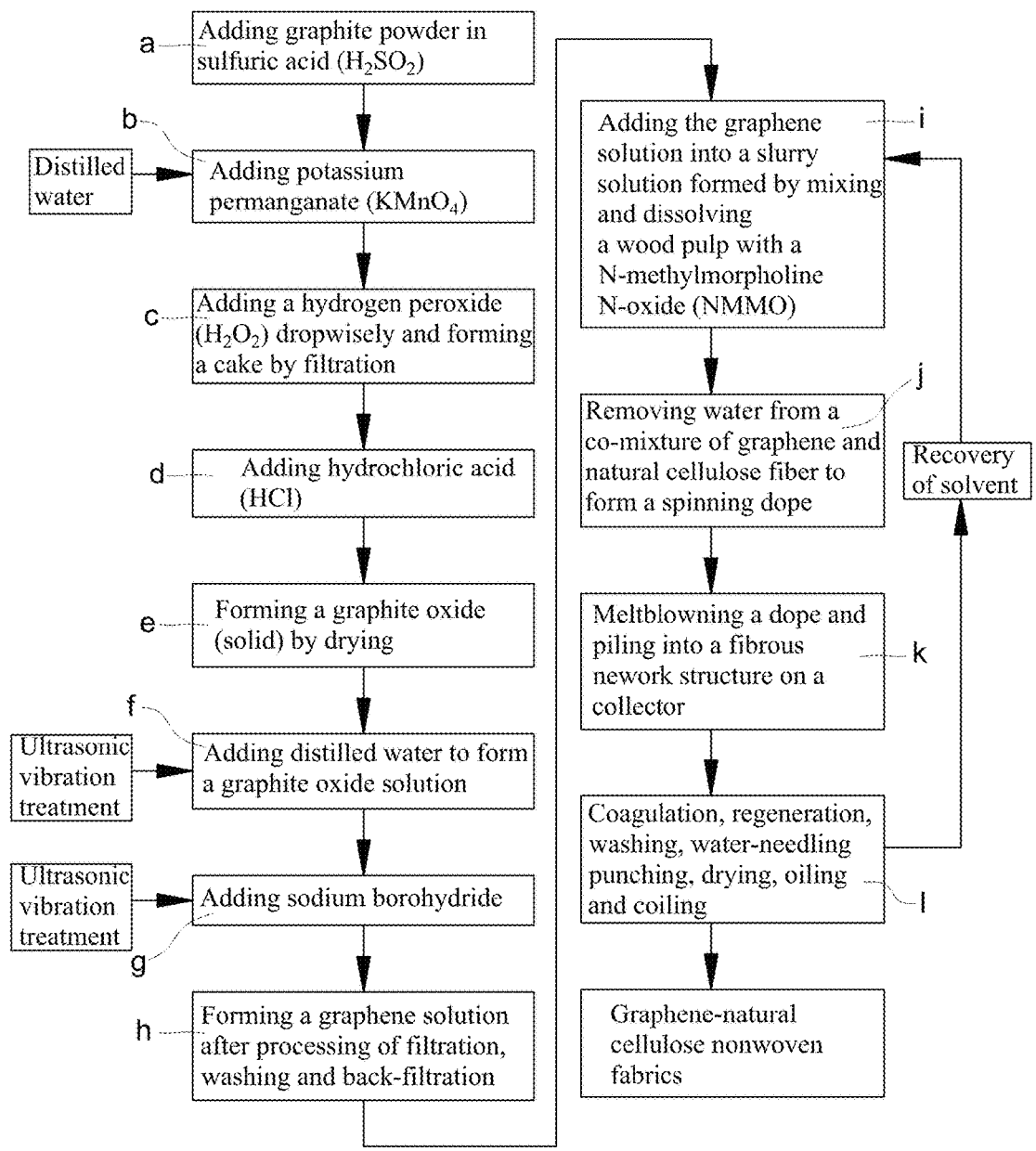
FIG. 1 is a block diagram showing the manufacturing process of the present invention.
Figure 2:
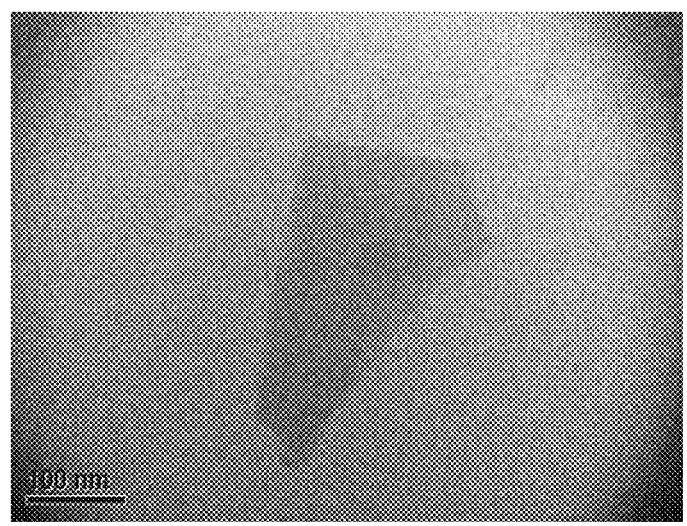
FIG. 2 is an electron microscope (TEM) image (100×) of the graphene prepared by the process according to the present invention.
Figure 3:
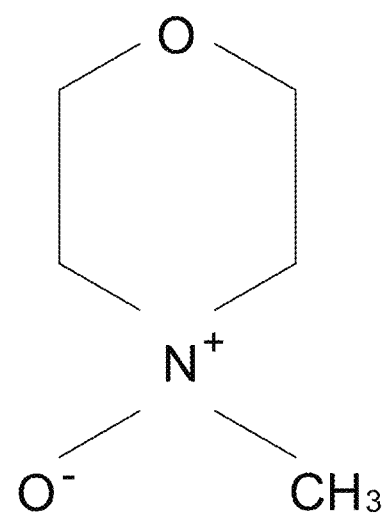
FIG. 3 shows a chemical structure of N-methylmorpholine N-oxide (referred to as NMMO) solvent, which is used in the present invention.
Figure 4:
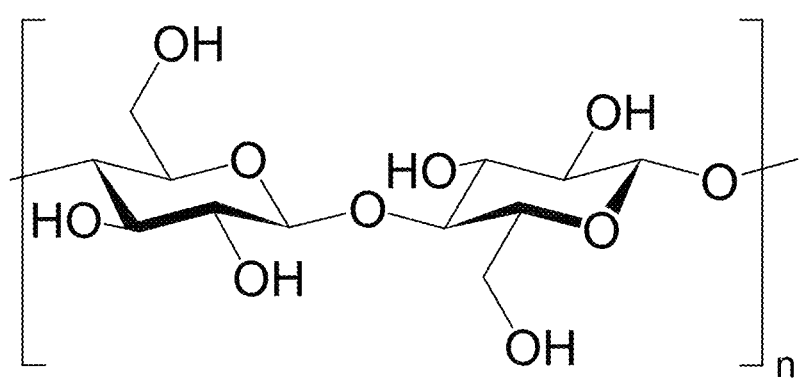
FIG. 4 shows a chemical structure of wood pulp cellulose, which is used in the present invention.
Figure 5:
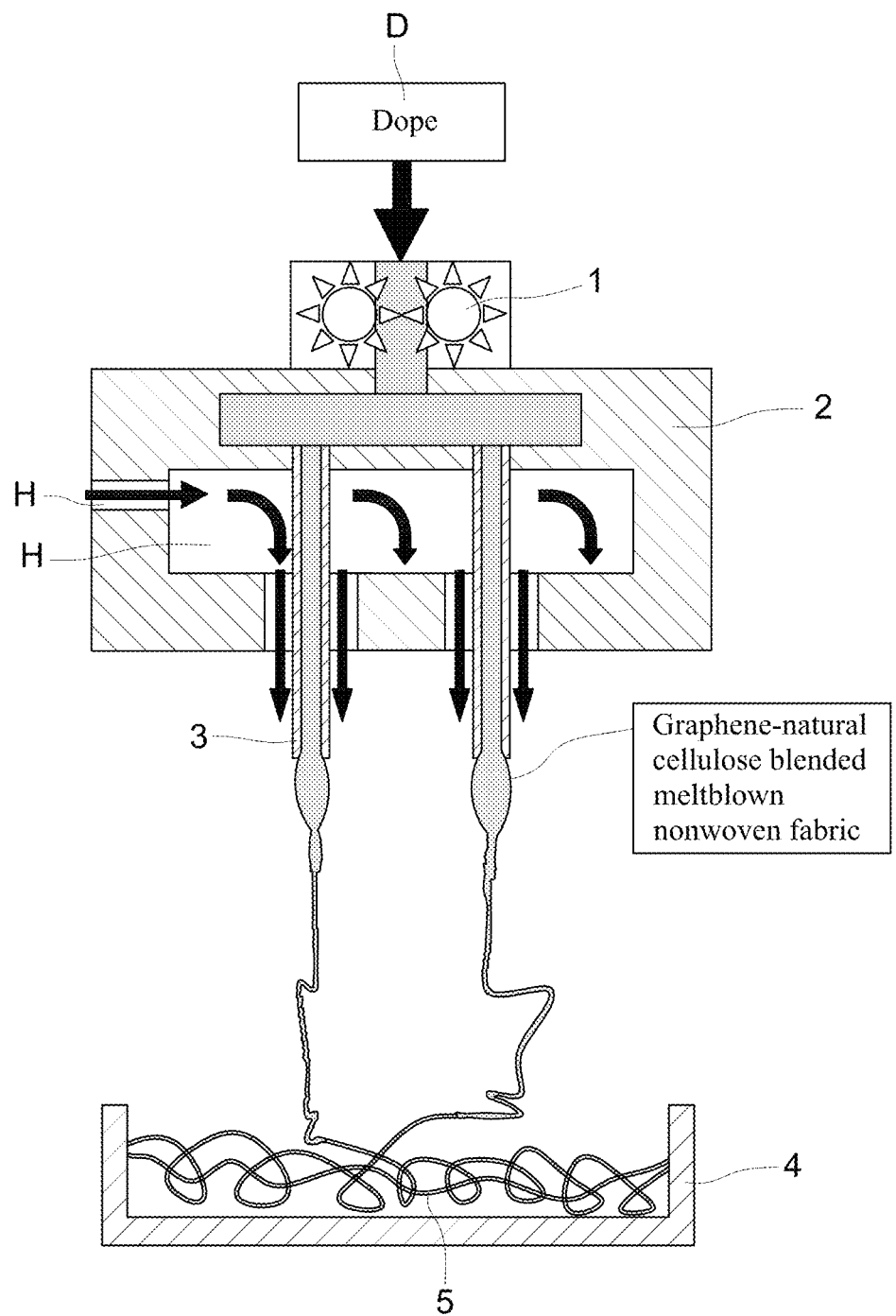
FIG. 5 is a schematic diagram showing the action of meltblowing natural graphene cellulose blended fabric of the present invention.
Figure 6:
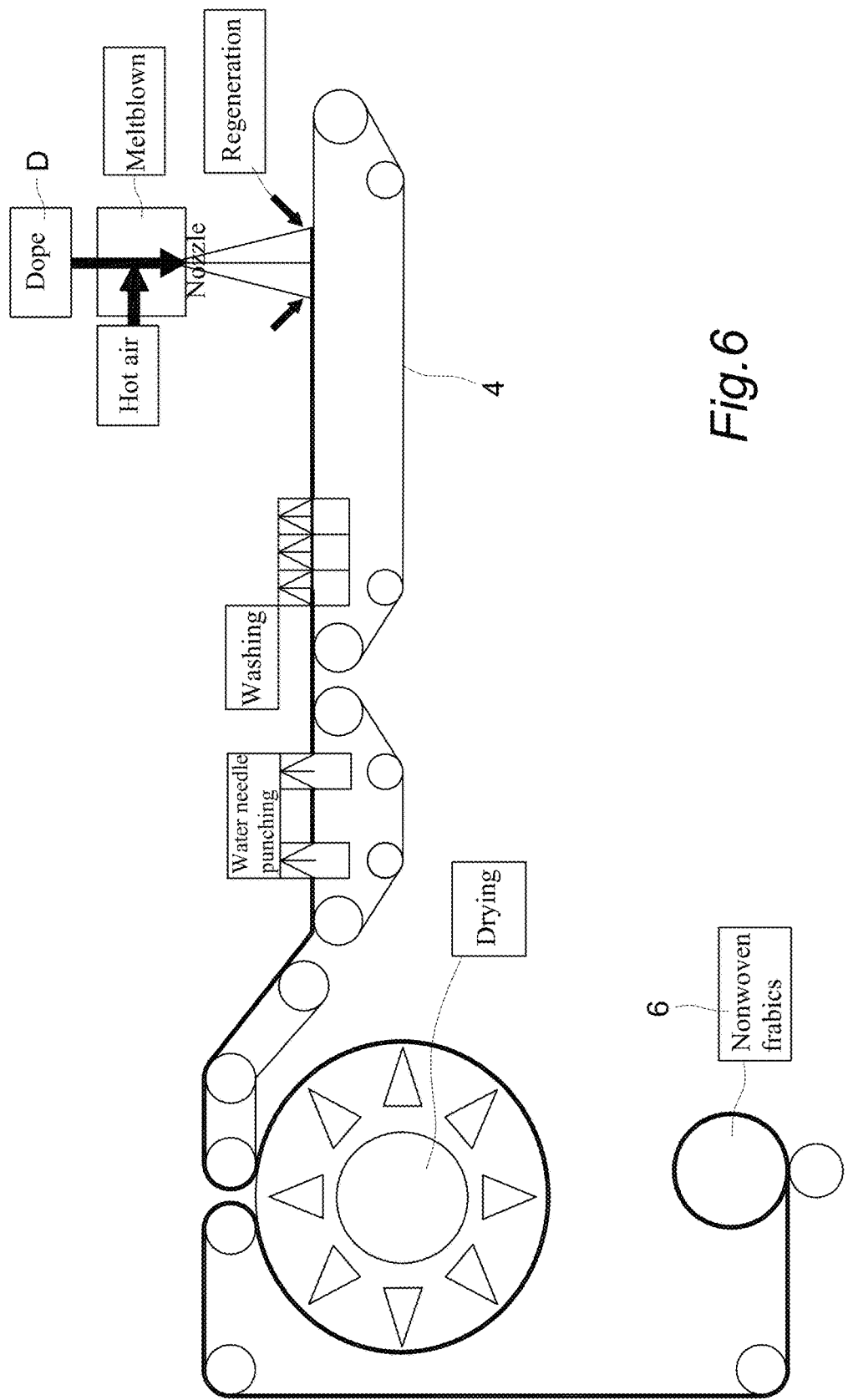
FIG. 6 is a schematic diagram showing the manufacturing process of the present invention.

Please refer to FIGS. 1 to 6. The present invention provides "a method of preparing natural graphene cellulose blended meltblown nonwoven fabric", which comprises the following steps:

(a) Adding sulfuric acid ($H_2SO_4$) in a graphite powder, which comprises pouring sulfuric acid with a concentration of 1 wt. % to 10 wt. % into a container comprising graphite powder, and then stirring for 30 minutes in an ice bath environment;

(b) Adding potassium permanganate ($KMnO_4$), which comprises: adding a potassium permanganate having a concentration of 1 wt. % to 20 wt. % into a mixture obtained from step (a), stirring for 1 to 2 hours, and adding an appropriate amount of distilled water, where the potassium permanganate is continuously added until none of purple smoke generated by reacting with the potassium permanganate, is formed from the di stilled water;

(c) Adding hydrogen peroxide ($H_2O_2$) and conducting a filtration, which comprises: dropwisely adding a hydrogen peroxide solution with a concentration of 1 wt. % to 10 wt. % to the solution obtained from step (b) for a reaction time of 1 hour, where bubbles are formed in the solution from step (b) during the hydrogen peroxide-adding period, and the addition of hydrogen peroxide is proceeds continuously proceeded until no more bubbles are formed and the solution changes to a dark green solution; and then filtering the dark green solution into a cake;

(d) Rinsing the cake with hydrochloric acid and washing the cake with water until it becomes neutral, which comprises rinsing the cake with 5.0% of HCl to remove sulfate ions, and then washing the cake with distilled water until it becomes neutral;

(e) Drying the cake to form a solid graphite oxide, which comprises drying the cake in an oven at 40° C. for 2 hours to obtain a dried solid graphite oxide;

(f) Adding distilled water to form a graphite oxide solution, which comprises adding 0.06 g dried graphite oxide into a container, adding distilled water to 200 ml, and then treating it by ultrasonic vibration for 30 minutes to obtain a graphite oxide solution, which has a concentration of 0.03 wt. % to 0.5 wt. % graphite oxide;

(g) Adding sodium borohydride ($NaBH_4$) to form a sodium borohydride containing graphene solution, which comprises adding 0.06 g of sodium borohydride ($NaBH_4$) with a concentration of 1 wt. % to 10 wt. % into the graphite oxide solution of step (f) and then treating it by ultrasonic vibration for 30 to 60 minutes, to obtain a sodium borohydride containing graphene solution, wherein in the sodium borohydride containing graphene solution, the ratio of graphene oxide to sodium borohydride is 1:1 to 1:5 by weight;

(h) Conducting filtration, water-washing and back-filtration to form a graphene solution, which comprises firstly filtrating a sodium borohydride containing graphene solution by filter paper, after the filtration is finished, then washing it with water 3 to 5 times to remove sodium borohydride, and finally back-filtrating the filter paper to obtain a graphene solution; wherein as shown in FIG. 2, the obtained graphene solution was dropped onto copper-made mesh and after it is dried, observed by TEM tests. Upon TEM testing, slight wrinkles can be found in the surface of graphene, while when the color is more light this demonstrates a small number of graphene layers and a state with a large area, in addition it can be observed that the graphene area is up to $1.0 \times 1.0 \ \mu m^2$;

(i) Adding the graphene solution into a slurry solution formed by mixing and dissolving a wood pulp with a N-methylmorpholine N-oxide (referred to as NMMO), which comprises firstly cutting a raw material of wood pulp into a small pieces, then putting it together with NMMO (of which the chemical structure is the same as shown in FIG. 3) and stabilizer in an expansion dissolving tank, as well as mixing and stirring therein, whereas the tank should be heated to keep a constant temperature of between 60 to 80° C., and is equipped with a vacuum condensation device for removing water, the vacuum degree of the expansion dissolving tank is between $-9.33*10^4$ Pa, wherein the graphene solution is added in a ratio of 0.11 wt. % to 5.0 wt. %, the raw wood pulp is a mixture of a long-fiber pulp (soft wood pulp) and a short-fiber pulp (hard wood pulp), of which both fibers are mixed in a mixing ratio of 0:100 to 100:0, and the used wood pulp has a polymerization degree of 500 to 1500 and has α-cellulose in an amount of 65% or more; and the NMMO has a concentration of 50% to 78%;

(j) Removing water from a co-mixture of graphene and natural cellulose to form a spinning dope, which comprises removing surplus water content by using a Thin Film Evaporator (TFE), the vacuum degree of Thin Film Evaporator is between $-9.39*10^4$ Pa to $-9.26*10^4$ Pa, and heating 80 to 130° C., whereas water is removed to 5% to 13% within 5 minutes, thereby the cellulose is dissolved to form a spinning dope, wherein the amount ratio of each component among the components comprised in the dope is: water ($H_2O$) 5% to 15%, N-methylmorpholine N-oxide (NMMO) 70% to 90%, and cellulose 5% to 15%;

(k) Squeezing the spinning dope from a spinning orifice by using a meltblown process to form a natural graphene cellulose blended filament strand and piling into a fibrous network structure on a collector, which comprises pressuring the spinning dope by a metering pump, and transporting the spinning dope into a spinning tank after filtration and degassing by a continuous filter (CPF), then forcing the spinning dope to be molten and squeezed to the outside of the spinning orifice by continuously blowing hot air into the spinning orifice and by outputting an air stream from surrounding of the spinning orifice, to form a long fiber filament strand; as shown in FIG. 5, after being squeezed out, the dope D is transported into spinning orifice mold 2 by a gear pump 1, then into the inside of spinning orifice tube 3 of spinning orifice mold 2, and by continuously blowing hot air H in high velocity into the interior of the spinning orifice mold 2, and by outputting an hot air stream from surrounding of the spinning orifice tube 3, the dope D is forced to be molten, and squeezed out to the outside from the spinning orifice tube 3, thereby a uniform natural graphene cellulose blended filament strand is formed and piled into a fibrous network structure 5 on a collector 4; and (l) Conducting solidified regeneration, washing, water needle punching, drying, oiling and coiling, which comprises: as shown in FIG. 6, spraying a water mist to enforce the natural graphene cellulose blended filament strand into a coagulation liquid for solidified regeneration and washing, then a graphene nature cellulose nonwoven fabric 6 is thus obtained after water needle punching, drying, oiling and coiling processes; wherein the concentration of the coagulation liquid is between 2.0% to 10.0%, and after washing, the amount of residual NMMO solvent is less than 0.1%.

In the method, the sulfuric acid of step (a) may be changed to hydrochloric acid (HCl), or perchloric acid ($HClO_4$), or hydrogen iodide (HI), or hydrofluoric acid (HF), or nitric acid ($HNO_3$), and of which each has a concentration of 1 wt. % to 10 wt. %; and the sodium borohydride ($NaBH_4$) of step (g) may be changed to potassium borohydride ($KBH_4$), or lithium aluminum hydride ($LiAlH_4$), or sodium citrate ($C_6H_5Na_3O_7$), and of which each has a concentration of 1 wt. % to 10 wt. %.

The raw wood pulp of step (i) may be changed to cotton pulp, or bamboo pulp, or a mixture of both of the cotton pulp and the bamboo pulp, each of which each has an α-cellulose content of more than 65%, and a polymerization degree of the cellulose of between 500 to 1500.

In addition, N-methylmorpholine N-oxide (NMMO) with lower concentration (2.0% to 10.0%) obtained during the regeneration and washing stages of step (l), will be recycled, and its recycle steps are as follows:

A. Conducting a primary filtration by using a filter cartridge 1 to 20 μm;

B. Injecting N-methylmorpholine N-oxide (NMMO) obtained after the primary filtration into a flocculation tank for a processing time of about 1 to 2 hours by using a fluctuant and other additives in an adding amount of 1.5 to 10.0 mg/L; during processing, colloidal impurities presented in the solution will agglomerate together by effect of flocculant, such non-soluble impurities can further form a high aggregation floc, as well as at the same time, the floc having adsorption capacity (large volume) begins to settle, and then is discharged out through slits of a filter mesh;

C. Injecting N-methylmorpholine N-oxide (NMMO) obtained after the flocculation processing into an ion exchange system, which comprises: through connection effect with an ion exchange resin having chargeability, sequentially colored impurities presented in the solution are adsorbed, separated, and effectively dilute the color of recycled liquid so that the coloring quality of the finished fabric can be ensured;

D. Conducting a filtration to a purified N-methylmorpholine N-oxide (NMMO) by using an ultra-filter and reverse osmosis (RO) filter;

E. Conducting concentration operation, which comprises: removing water content of N-methylmorpholine N-oxide (NMMO) with low concentration by distillation through recirculation operation of a multi-effect evaporation device, and purifying it step by step in the manner of stage concentration, then until the concentration of the solvent becomes 50.0% to 78.0%, discharging it to production line to be used as a feed material; and F. Finally, conducting a fine filtration one more time to a concentrated solvent obtained after completion of the concentration operation, by using an ultra-filter and reverse osmosis (RO) filter, wherein the recycle ratio of N-methylmorpholine N-oxide (NMMO) can be up to 99.5% or more, and the usage of the condensed recycled water can be up to 100%.

EXAMPLES

To further prove the features and the implementation effectiveness of the present invention, various test examples were completed and they are described as follows.

Example 1

(a) Adding sulfuric acid ($H_2SO_4$) in a graphite powder, which comprises pouring graphite powder 1.0 g into 250 ml beaker, and under ice-cooling environment, adding 23 ml of sulfuric acid, then stirring it for 30 minutes;

(b) Adding potassium permanganate ($KMnO_4$), which comprises: adding a potassium permanganate 4.0 g into a mixture obtained from step (a), stirring it for 1 to 2 hours, and adding an appropriate amount of distilled water, until that none of purple smoke which is generated by reacting with the potassium permanganate, is formed form the distilled water;

(c) Adding a hydrogen peroxide ($H_2O_2$) and conducting a filtration, which comprises: dropwisely adding 5.0% to 10.0% hydrogen peroxide in a solution obtained from step (b), where bubbles are formed from solution during the hydrogen peroxide-adding period, and the addition of hydrogen peroxide is continuously proceeded until that none of bubble is formed form the solution, simultaneously the solution is changed to a dark green solution; and then filtering the dark green solution into a cake;

(d) Rinsing the cake by hydrochloric acid and washing the cake by water till it becomes neutral, which comprises rinsing the cake by using 5.0% of to 10.0% HCl to remove sulfate ions, and then washing the cake by distilled water until it becomes neutral;

(e) Drying the cake to form a solid graphite oxide, which comprises drying the cake in an oven under 40° C. to 60° C. for 24 to 48 hours to obtain a dried solid graphite oxide;

(f) Adding distilled water to form a graphite oxide solution, which comprises adding dried graphite oxide 0.06 g into beaker, adding distilled water to 200 ml, and then treating it by ultrasonic vibration for 30 to 60 minutes to obtain a graphite oxide solution, which has a concentration of 0.03 wt. %;

(g) Adding sodium borohydride ($NaBH_4$) to form a sodium borohydride containing graphene solution, which comprises adding 0.06 g of sodium borohydride ($NaBH_4$) with a concentration of 1 wt. % to 10 wt. % into the a graphite oxide solution of step (f) and then treating it by ultrasonic vibration for 30 to 60 minutes, thereby a sodium borohydride containing graphene solution is obtained;

(h) Conducting filtration, water-washing and back-filtration to form a graphene solution, which comprises firstly filtrating a sodium borohydride containing graphene solution by filter paper, after the filtration is finished, then washing it by water for 3 to 5 times to remove sodium borohydride, and finally back-filtrating the filter paper to obtain a graphene solution;

(i) Adding the graphene solution into a slurry solution formed by mixing and dissolving a wood pulp with a N-methylmorpholine N-oxide (referred to as NMMO), which comprises firstly cutting a raw material of wood pulp with a polymerization degree 650 into a small pieces, then putting it together with NMMO and stabilizer in an expansion dissolving tank, as well as mixing and stirring therein, whereas the tank should be heated to keep a constant temperature of between 60° C. to 80° C., and is equipped with a vacuum condensation device for removing water, wherein the graphene solution is added in an addition ratio of 0.01 wt. % to 3.0 wt. %.

(j) Removing water from a co-mixture of graphene and natural cellulose to form a spinning dope, which comprises removing surplus water content by using a Thin Film Evaporator (TFE), heating in 80° C. to 130° C., whereas water is removed to 5% to 13% within 5 minutes, thereby the cellulose is dissolved to form a spinning dope;

(k) Squeezing the spinning dope from a spinning orifice by using meltblown process to form a natural graphene cellulose blended filament strand and piling it into a fibrous network structure on a collector, which comprises pressuring the spinning dope by a metering pump, and transporting the spinning dope into a spinning tank after filtration and degassing by a continuous filter (CPF), then by continuously blowing hot air into the spinning orifice and by outputting an air stream from surrounding of the spinning orifice, forcing the spinning dope to be molten and squeezed to the outside of the spinning orifice to form a long cellulose filament strand and to be piled into a fibrous network structure on a collector; and (l) Spraying water mist to enforce the natural graphene cellulose blended filament strand into a coagulation liquid for solidified regeneration and washing, then a graphene nature cellulose nonwoven fabric is thus obtained after water needle punching, drying, oiling and coiling processes; the fabric samples obtained as above are shown as Sample No. 1 to 12 in Table 1.

Example 2

(a) Adding sulfuric acid ($H_2SO_4$) in a graphite powder, which comprises pouring graphite powder 1.0 g into 250 ml beaker, and under ice-cooling environment, adding 23 ml of sulfuric acid, then stirring it for 30 minutes;

(b) Adding potassium permanganate ($KMnO_4$), which comprises: adding a potassium permanganate 4.0 g into a mixture obtained from step (a), stirring it for 1 to 2 hours, and adding an appropriate amount of distilled water, until that none of purple smoke which is generated by reacting with the potassium permanganate, is formed form the distilled water;

(c) Adding a hydrogen peroxide ($H_2O_2$) and conducting a filtration, which comprises: dropwisely adding 5.0% to 10.0% hydrogen peroxide in a solution obtained from step (b), where bubbles are formed from solution during the hydrogen peroxide-adding period, and the addition of hydrogen peroxide is continuously proceeded until that none of bubble is formed form the solution, simultaneously the solution is changed to a dark green solution; and then filtering the dark green solution into a cake;

(d) Rinsing the cake by hydrochloric acid and washing the cake by water till it becomes neutral, which comprises rinsing the cake by using 5.0% to 10.0% HCl to remove sulfate ions, and then washing the cake by distilled water until it becomes neutral;

(e) Drying the cake to form a solid graphite oxide, which comprises drying the cake in an oven under 40° C. to 60° C. for 24 to 48 hours to obtain a dried solid graphite oxide;

(f) Adding distilled water to form a graphite oxide solution, which comprises adding dried graphite oxide 0.06 g into beaker, adding distilled water to 200 ml, and then treating it by ultrasonic vibration for 30 to 60 minutes to obtain a graphite oxide solution, which has a concentration of 0.03 wt. %;

(g) Adding sodium borohydride ($NaBH_4$) to form a sodium borohydride containing graphene solution, which comprises adding 0.06 g of sodium borohydride (NaBH$_4$) with a concentration of 1 wt. % to 10 wt. % into the a graphite oxide solution of step (f) and then treating it by ultrasonic vibration for 30 to 60 minutes, thereby a sodium borohydride containing graphene solution is obtained;

(h) Conducting filtration, water-washing and back-filtration to form a graphene solution, which comprises firstly filtrating a sodium borohydride containing graphene solution by filter paper, after the filtration is finished, then washing it by water for 3 to 5 times to remove sodium borohydride, and finally back-filtrating the filter paper to obtain a graphene solution;

(i) Adding the graphene solution into a slurry solution formed by mixing and dissolving a wood pulp with a N-methylmorpholine N-oxide (referred to as NMMO), which comprises firstly cutting a raw material of wood pulp with a polymerization degree 1050 into a small pieces, then putting it together with NMMO and stabilizer in an expansion dissolving tank, as well as mixing and stirring therein, whereas the tank should be heated to keep a constant temperature of between 60° C. to 80° C., and is equipped with a vacuum condensation device for removing water, wherein the graphene solution is added in an addition ratio of 0.01 wt. % to 3.0 wt. %.

(j) Removing water from a co-mixture of graphene and natural cellulose to form a spinning dope, which comprises removing surplus water content by using a Thin Film Evaporator (TFE), heating in 80° C. to 130° C., whereas water is removed to 5% to 13% within 5 minutes, thereby the cellulose is dissolved to form a spinning dope;

(k) Squeezing the spinning dope from a spinning orifice by using meltblown process to form a natural graphene cellulose blended filament strand and piling it into a fibrous network structure on a collector, which comprises pressuring the spinning dope by a metering pump, and transporting the spinning dope into a spinning tank after filtration and degassing by a continuous filter (CPF), then by continuously blowing hot air into the spinning orifice and by outputting an air stream from surrounding of the spinning orifice, enforcing the spinning dope to be molten and squeezed to the outside of the spinning orifice to form a long cellulose filament strand and to be piled into a fibrous network structure on a collector; and (l) Spraying water mist to enforce the natural graphene cellulose blended filament strand into a coagulation liquid for solidified regeneration and washing, then a graphene nature cellulose nonwoven fabric is thus obtained after water needle punching, drying, oiling and coiling processes; the fabric samples obtained as above are shown as Sample No. 13 to 24 in Table 1.

TABLE 1

Compositions of each raw meltblown solution of various samples

| Sample | Polymerization degree of cellulose | Blending ratio of graphene solution (wt. %) | Amount of cellulose (%) | Amount of solvent (%) | Amount of Water (%) |
|---|---|---|---|---|---|
| 1 | 650 | 0.01 | 9.1 | 80.3 | 10.6 |
| 2 | 650 | 0.03 | 9.1 | 81.5 | 9.4 |
| 3 | 650 | 0.05 | 9.3 | 81.1 | 9.6 |
| 4 | 650 | 0.08 | 8.7 | 81.4 | 9.9 |
| 5 | 650 | 0.11 | 8.6 | 81.0 | 10.4 |
| 6 | 650 | 0.2 | 8.4 | 81.1 | 10.5 |
| 7 | 650 | 0.3 | 8.3 | 81.7 | 10.0 |
| 8 | 650 | 0.4 | 9.0 | 80.5 | 10.5 |
| 9 | 650 | 0.5 | 8.4 | 82.4 | 9.2 |
| 10 | 650 | 1 | 9.1 | 80.2 | 10.7 |
| 11 | 650 | 2 | 8.8 | 81.1 | 10.1 |
| 12 | 650 | 3 | 8.7 | 80.1 | 11.2 |
| 13 | 1050 | 0.01 | 8.4 | 82.3 | 9.3 |
| 14 | 1050 | 0.03 | 8.7 | 82.2 | 9.1 |
| 15 | 1050 | 0.05 | 8.6 | 81.7 | 9.7 |
| 16 | 1050 | 0.08 | 8.6 | 81.0 | 10.4 |
| 17 | 1050 | 0.11 | 9.2 | 80.2 | 10.6 |
| 18 | 1050 | 0.2 | 8.4 | 81.5 | 10.1 |
| 19 | 1050 | 0.3 | 8.7 | 81.3 | 10.0 |
| 20 | 1050 | 0.4 | 8.8 | 81.3 | 9.9 |
| 21 | 1050 | 0.5 | 9.0 | 81.1 | 9.9 |
| 22 | 1050 | 1 | 8.9 | 81.3 | 9.8 |
| 23 | 1050 | 2 | 9.2 | 80.5 | 10.3 |
| 24 | 1050 | 3 | 9.1 | 80.7 | 10.2 |

The fabric samples obtained as above Samples No. 1 to 24 are further evaluated by an assessment of antistatic property and thermal conductivity.

Example 3

Antistatic Performance Test

Antistatic performance is tested according to FTTS-FA-009 (Specified Requirement of Antistatic Textile, and with reference to the standard of AATCC76 (Electrical Resistivity Fabrics) by using concentric electrode surface resistance meters, and the surface resistance value of each sample, the half-life of charge recession and frictional-charged electrostatic potential are tested to evaluate the antistatic effect of the natural graphene cellulose blended meltblown nonwoven fabrics. Results of antistatic performance test made to each of the fibers Samples No. 1 to 24 are shown in Table 2.

TABLE 2

Antistatic Performance Test of natural graphene cellulose blended meltblown nonwoven fabrics

| Sample | Polymerization degree of cellulose | Blending ratio of graphene solution (wt. %) | Surface Resistance (Ω) | half-life of charge recession (sec.) | frictional-charge electrostatic potential (V) | Test result (grade) |
|---|---|---|---|---|---|---|
| 1 | 650 | 0.01 | $9.65 \times 10^9$ | <0.1 | 265 | 1 |
| 2 | 650 | 0.03 | $8.52 \times 10^9$ | <0.1 | 219 | 1 |
| 3 | 650 | 0.05 | $7.41 \times 10^9$ | <0.1 | 212 | 1 |
| 4 | 650 | 0.08 | $4.55 \times 10^9$ | <0.1 | 195 | 1 |
| 5 | 650 | 0.11 | $6.41 \times 10^8$ | <0.01 | 152 | 2 |
| 6 | 650 | 0.3 | $1.49 \times 10^8$ | <0.01 | 106 | 2 |
| 7 | 650 | 0.5 | $7.09 \times 10^7$ | <0.01 | 88 | 2 |
| 8 | 650 | 0.7 | $4.59 \times 10^7$ | <0.01 | 74 | 2 |

TABLE 2-continued

Antistatic Performance Test of natural graphene cellulose blended meltblown nonwoven fabrics

| Sample | Polymerization degree of cellulose | Blending ratio of graphene solution (wt. %) | Surface Resistance ($\Omega$) | half-life of charge recession (sec.) | frictional-charge electrostatic potential (V) | Test result (grade) |
|---|---|---|---|---|---|---|
| 9 | 650 | 0.9 | $6.58 \times 10^6$ | <0.01 | 63 | 2 |
| 10 | 650 | 1.0 | $3.72 \times 10^6$ | <0.01 | 55 | 2 |
| 11 | 650 | 2.0 | $1.71 \times 10^6$ | <0.01 | 48 | 2 |
| 12 | 650 | 3.0 | $1.02 \times 10^5$ | <0.01 | 44 | 2 |
| 13 | 1050 | 0.01 | $9.59 \times 10^9$ | <0.1 | 254 | 1 |
| 14 | 1050 | 0.03 | $8.42 \times 10^9$ | <0.1 | 221 | 1 |
| 15 | 1050 | 0.05 | $7.19 \times 10^9$ | <0.1 | 204 | 1 |
| 16 | 1050 | 0.08 | $6.57 \times 10^9$ | <0.1 | 197 | 1 |
| 17 | 1050 | 0.11 | $7.58 \times 10^8$ | <0.01 | 145 | 2 |
| 18 | 1050 | 0.3 | $1.26 \times 10^8$ | <0.01 | 105 | 2 |
| 19 | 1050 | 0.5 | $5.77 \times 10^7$ | <0.01 | 87 | 2 |
| 20 | 1050 | 0.7 | $2.84 \times 10^7$ | <0.01 | 70 | 2 |
| 21 | 1050 | 0.9 | $5.99 \times 10^6$ | <0.01 | 62 | 2 |
| 22 | 1050 | 1.0 | $4.53 \times 10^6$ | <0.01 | 51 | 2 |
| 23 | 1050 | 2.0 | $2.09 \times 10^6$ | <0.01 | 51 | 2 |
| 24 | 1050 | 3.0 | $1.25 \times 10^5$ | <0.01 | 46 | 2 |

According to the results as shown in Table 2, it is known: when blending ration of graphene came to 0.11 wt. %, the test result will become Grade 2. The test result of Grade 2 means that its antistatic effect is considered as in a level of "good". Further, the surface resistance of fibers will be also enlarged accompany with the increase in concentration of graphene added therein. Furthermore, the natural graphene cellulose blended meltblown nonwoven fabrics prepared by the present invention has an antistatic performance much higher than that of general meltblown nonwoven fabrics sold in market.

Example 4

Thermal Conductivity Performance Test

The thermal conductivity of general nature cellulose nonwoven fabrics sold in the market is lower in comparison. Results of thermal conductivity performance test made to each of Samples No. 1 to 24 of the natural graphene cellulose blended meltblown nonwoven fabrics prepared by the present invention are shown in Table 3.

TABLE 3

Thermal Conductivity Performance Test of natural graphene cellulose blended meltblown nonwoven fabrics

| Sample | Polymerization degree of cellulose | Blending ratio of graphene solution (wt. %) | Thermal conductivity coefficient (W/m · K) |
|---|---|---|---|
| 1 | 650 | 0.01 | 0.53 |
| 2 | 650 | 0.03 | 0.79 |
| 3 | 650 | 0.05 | 0.82 |
| 4 | 650 | 0.08 | 0.88 |
| 5 | 650 | 0.11 | 0.93 |
| 6 | 650 | 0.3 | 1.05 |
| 7 | 650 | 0.5 | 1.13 |
| 8 | 650 | 0.7 | 1.39 |
| 9 | 650 | 0.9 | 1.57 |
| 10 | 650 | 1 | 1.76 |
| 11 | 650 | 2 | 1.81 |
| 12 | 650 | 3 | 1.93 |
| 13 | 1050 | 0.01 | 0.47 |
| 14 | 1050 | 0.03 | 0.63 |
| 15 | 1050 | 0.05 | 0.78 |
| 16 | 1050 | 0.08 | 0.86 |
| 17 | 1050 | 0.11 | 0.96 |
| 18 | 1050 | 0.3 | 1.10 |
| 19 | 1050 | 0.5 | 1.25 |
| 20 | 1050 | 0.7 | 1.36 |
| 21 | 1050 | 0.9 | 1.48 |
| 22 | 1050 | 1 | 1.55 |
| 23 | 1050 | 2 | 1.71 |
| 24 | 1050 | 3 | 1.87 |

According to the results as shown in Table 3, it is known: each of the natural graphene cellulose blended meltblown nonwoven fabrics prepared by the present invention has thermal conductivity coefficient higher than that of general meltblown nonwoven fabrics sold in market, and the thermal conductivity coefficient will be also enlarged accompany with the increase in amount of graphene, and there by the thermal conductivity performance is also upgraded.

In summary, according to the present invention, since a natural graphene cellulose blended meltblown nonwoven fabric is prepared by adding the graphene solution in a mixture slurry formed by mixing and dissolving a wood pulp with N-methylmorpholine N-oxide (NMMO), removing the water content thereof to form a spinning dope, and then by a meltblown process to directly prepare a natural graphene cellulose meltblown nonwoven fabric product, thereby there is no need of either a processing procedure including a reduction process or use of a highly toxic hydrazine hydrate solution which is required in a reduction process, and no occurrence of health hazards such as dizziness, nausea and others resulting from operator exposure through inhalation or skin contact with a highly toxic hydrazine hydrate solution, and thus the preparation method provided by the present invention is a safe and harmless process as to operators. Further, by increasing the adding ratio of the graphene solution in the manufacturing process, the antistatic performance and thermal conductivity function can be controlled, and thereby various consumers' requirements for antistatic properties and thermal conductivity functions can also can be satisfied. Besides, the present fabric can decompose naturally upon disposal after use. For at least these reasons, the present product is harmless, natural and environmentally friendly and should be considered as a novel invention with excellent potential capabilities in various real applications.

What is claimed is:

1. A method of preparing natural graphene cellulose blended meltblown nonwoven fabric, which comprises the following steps:
    (a) combining a graphite powder with a solution comprising 1 to 10 wt. % of a first compound selected from the group consisting of sulfuric acid ($H_2SO_4$), hydrochloric acid (HCl), perchloric acid ($HClO_4$), hydrogen iodide (HI), hydrofluoric acid (HF), and nitric acid ($HNO_3$), then stirring for 30 minutes in an ice bath environment;
    (b) adding a solution comprising 1 to 20 wt. % potassium permanganate ($KMnO_4$) to the product of step (a), stirring for 1 to 2 hours, and adding distilled water, wherein the potassium permanganate solution is continuously added until reaction of the potassium permanganate and the product of step (a) and the distilled water is complete;
    (c) adding a solution comprising 1 to 10 wt. % hydrogen peroxide ($H_2O_2$) to the product of step (b), wherein the hydrogen peroxide solution is added until reaction between the hydrogen peroxide and the product step (b) is complete and the mixture becomes green, then filtering the green solution into a cake;
    (d) rinsing the cake of step (c) with a solution comprising 5 wt. % hydrochloric acid (HCl) to remove sulfate ions, then washing the cake with distilled water;
    (e) drying the cake of step (d) in an oven at 40° C. for 2 hrs to obtain a dried solid graphite oxide;
    (f) adding distilled water to the dried solid graphite oxide of step (e), wherein the distilled water is added up to 200 mls per 0.06 to 1.0 g of the dried solid graphite oxide, then treating by ultrasonic vibration for 30 minutes to obtain a graphite oxide solution having a graphite oxide concentration of 0.03 wt. % to 0.5 wt. %;
    (g) adding a solution comprising 1 to 10 wt. % of a second compound selected from the group consisting of sodium borohydride ($NaBH_4$), potassium borohydride ($KBH_4$), lithium aluminum hydride ($LiAlH_4$), and sodium citrate ($C_6H_5Na_3O_7$) to the graphite oxide solution of step (f), then treating by ultrasonic vibration for 30 to 60 minutes, wherein in the resulting solution, the ratio of graphene oxide to the second compound is 1:1 to 1:5 by weight;
    (h) filtrating the product of step (g), washing the filtrate with water 3 to 5 times to remove the second compound, then back-filtrating to obtain a graphene solution;
    (i) adding the graphene solution of step (h) to a slurry solution formed by mixing a pulp with N-methylmorpholine N-oxide (NMMO) and a stabilizer in an expansion dissolving tank, then mixing at 60 to 80° C., wherein the graphene solution of step (h) is added in a ratio of 0.11 to 5.0 wt. %, the pulp is selected from the group consisting of wood pulp, cotton pulp, bamboo pulp and a mixture of cotton and bamboo pulp, the pulp comprises α-cellulose in an amount of 65% or more with a polymerization degree of 500 to 1500; and the NMMO has a concentration of 50% to 78%;
    (j) removing water from the product of step (i) using a Thin Film Evaporator (TFE) and heating at 80 to 130° C., wherein the water is removed to 5% to 13% within 5 minutes and the cellulose is dissolved to form a spinning dope, and the amount ratio of each component among the components comprised in the dope is: water ($H_2O$) 5% to 15%, N-methylmorpholine N-oxide (NMMO) 70% to 90%, and cellulose 5% to 15%;
    (k) squeezing the spinning dope of step (j) from a spinning orifice using a meltblown process to form a natural graphene cellulose blended filament strand and piling into a fibrous network structure on a collector, which comprises pressuring the spinning dope by a metering pump, filtrating and degassing by a continuous filter (CPF), transporting the spinning dope into a spinning tank, continuously blowing hot air into the spinning orifice and outputting an air stream from the area surrounding the spinning orifice, forcing the spinning dope to be molten and squeezed to the outside of the spinning orifice to form a uniform natural graphene cellulose blended filament strand, and piling the filament strand onto a fibrous network structure on a collector; and
    (l) spraying a water mist to force the natural graphene cellulose blended filament strand of step (k) into a coagulation liquid, solidifying, regenerating and washing the filament strand, and water needle punching, drying, oiling and coiling the filament strand to form a natural graphene cellulose blended meltblown nonwoven fabric, wherein the concentration of the coagulation liquid is between 2.0% to 10.0%, and after washing, the amount of residual NMMO solvent is less than 0.1%.

2. The method of claim 1, wherein in step (a) the first compound is sulfuric acid.

3. The method of claim 1, wherein in step (g) the second compound is sodium borohydride.

4. The method of claim 1, wherein in step (i) the expansion dissolving tank is equipped with a vacuum condensation device for removing water.

5. The method of claim 4, wherein the vacuum degree of the expansion dissolving tank is between $-9.33*10^4$ Pa.

6. The method of claim 1, wherein in step (i) the pulp is wood pulp.

7. The method of claim 6, wherein the wood pulp is selected from the group consisting of long-fiber pulp (soft wood pulp), short-fiber pulp (hard wood pulp), and a combination thereof.

8. The method of claim 1, wherein in step (j) the vacuum degree of the Thin Film Evaporator is between $-9.39*10^4$ Pa to $-9.26*10^4$ Pa.

9. The method of claim 1, further comprising a recycle process of N-methylmorpholine N-oxide (NMMO) released during the regeneration and washing stages of step (1), which comprises the following recycle steps:
    A. filtering the NMMO released during the regeneration and washing stages of step (1) using a filter cartridge 1 to 20 μm;
    B. injecting the NMMO obtained after the filtration of step A. into a flocculation tank, processing for about 1 to 2 hours using a fluctuant and other additives in an adding amount of 1.5 to 10.0 mg/L; discharging impurities out through slits of a filter mesh;

C. injecting NMMO obtained after the flocculation processing of step B. into an ion exchange system comprising an ion exchange resin having chargeability;

D. filtering the product of step C. by using an ultra-filter and a reverse osmosis (RO) filter;

E. reducing the water content the product of step D. by distillation through the recirculation operation of a multi-effect evaporation device, purifying it step by step until the concentration of the NMMO becomes 50.0% to 78.0%, then discharging it to be used as a feed material; and F. filtering the product of step E. using an ultra-filter and reverse osmosis (RO) filter.

10. The method of claim 9, wherein the recycle ratio of NMMO is 99.5% or more, and the usage of the condensed recycled water is 100%.

* * * * *